United States Patent Office 2,724,654
Patented Nov. 22, 1955

2,724,654

RUST PREVENTIVE COMPOSITIONS

William C. Howell, Jr., Union, and Walter E. Waddey, Roselle, N. J., assignors to Esso Research and Engineering Company, a corporation of Delaware No Drawing. Application March 8, 1952, Serial No. 275,658

5 Claims. (Cl. 106—14)

The present invention relates to rust preventive compositions, and particularly to rust inhibitors which may be applied in the form of coatings, or layers, to ferrous metals to protect them against deterioration over an extended period of time. The invention relates more particularly to rust preventing compositions of a solvent, mineral oil or synthetic oil base, incorporating a combination of a viscous resinous material and active rust inhibiting ingredients. It has to do particularly with compositions of volatile base.

In the prior art numerous compositions have been proposed for coating ferrous metal machined parts and the like. The protection of machinery, ordnance equipment and the like against rust is extremely important when such machinery and equipment are to be transported overseas, or placed in areas where humid conditions prevail. Successful rust inhibiting compositions should be easily applied and easily removed. They should be sufficiently stable to give substantial protection and permit at least limited handling of the protected equipment without being too easily removed from its surface. In United States Patent No. 2,182,992 there is disclosed an effective rust preventive oil containing sulfonates and a fatty oil such as degras. Both the latter ingredients are occasionally in short supply. An object of the present invention is to make available a satisfactory replacement.

In the prior art it has been found that certain partial fatty acid esters of polyhydric alcohols have good rust inhibiting properties. These are quite effective in lubricating oils, as in Patent No. 2,434,490, but are quite ineffective in volatile solvents. Among these esters are such materials as sorbitan monooleate, pentaerythritol monooleate, polyglycerol monooleate, and related materials. The present invention utilizes these ingredients along with special viscous and adhesive types of resinous polymeric materials. Such ingredients may be incorporated in a mineral base lubricating oil to form an effective oily coating. It has also been suggested in the prior art that these partial esters may be placed in more viscous materials such as waxes and greases but it has been felt that asphaltenes and other resinous constituents of petroleum must be avoided, e. g. Patent No. 2,482,517.

According to the present invention it has been found that volatile solvent hydrocarbons containing petroleum resins, especially the propane precipitated resins obtained from typical Pennsylvania base oils, have outstanding properties when used in combination with the polyhydric alcohol partial ester inhibitors mentioned above. These petroleum resins may vary in consistency from viscous oils to soft plastic solids. They appear to have a relatively high aromatic content. They are essentially hydrocarbons, however, and are ordinarily obtained by diluting mineral oil residues with propane or similar light hydrocarbon which dissolves the paraffinic constituents and separates the resinous materials. These resinous materials are quite adhesive and tacky in nature. They adhere exceedingly well to metal surfaces when applied thereto in volatile solvents. With optimum concentrations of resin and partial ester they are highly effective.

Preferred compositions consist of 75 to 98% by weight of hydrocarbon oil, preferably light volatile hydrocarbon solvents boiling below about 500° F. In some cases a light lubricating oil may be used or a mixture of oil and solvent may be employed. To such oil, or solvent, there is added from 1 to 15% of a viscous hydrocarbon resin preferably a propane precipitated resin as from Pennsylvania base oil and from 1 to about 10% by weight, based on the total composition, of the polyhydric alcohol partial ester. The most satisfactory proportions are 5 to 10% of resin and 3 to 6% of the ester. The invention will be more fully understood by reference to the following specific examples.

Example I

A composition was prepared of solvent (Stoddard type) naphtha having an ASTM distillation range of 320 to 400° F., and 5% of sorbitan monooleate. In the standard humidity cabinet test at 120° F. and 100% relative humidity, clean steel specimens coated with this material rusted within 24 hours.

Example II

Example I was repeated except that 10% of propane precipitated resin was used and no ester. The solvent evaporated rather rapidly leaving only the resinous material on coated steel specimens. Two different types of resin were used and the compositions were tested in the same manner as in Example I with the following results:

Ex. II (a)

Solvent naphtha+10% resin A<24 hours

Ex. II (b)

Solvent naphtha+10% resin B<24 hours

Example III

A composition was prepared including both of the additives, i. e. 5% of sorbitan monooleate ("Span 80") and 5% of resin A. It had a rust resisting life in excess of 1000 hours.

Example IV

Compositions of 5% of sorbitan monooleate and 10% of each of three different petroleum resins in solvent naphtha were prepared. All of them ran over 1000 hours in the humidity cabinet test without rusting.

Example V

Example III was repeated except that pentaerythritol monooleate was used as the rust inhibitor in place of the "Span 80." Results were similar. The same is true of glycerol monooleate.

Example VI

Examples III and IV were repeated, using a lubricating oil of about 40 S. S. U. viscosity at 210° F. in lieu of solvent naphtha. The base oil also was tested by itself. Results are tabulated in Table I. It will be noted that oils without resinous or viscous constituents give good protection.

TABLE I

*Additives in base oil, wt. per cent*

| | |
|---|---|
| 1. None | <24 |
| 2. 5% "Span 80" | 936 |
| 3. 10% "Kendex Resins 0834" * | <24 |
| 4. 5% "Span 80"+10% "Kendex Resins 0834" * | >1100 |
| 5. 5% "Span 80" + 10% "Pennzoil Resins C-7730" * | >1100 |
| 6. 5% "S-Polymer" Concentrate (copolymer of styrene and isobutylene) | <24 |
| 7. 5% "Span 80"+5% "S-Polymer" Concentrate | >1100 |
| 8. 5% pentaerythritol monooleate+10% "Kendex Resins 0834" | >1100 |
| 9. 1% "Span 80" | <24 |
| 10. 1% "Span 80"+5% "S-Polymer" Concentrate | 168 |

*Propane precipitated resin from Pennsylvania base oils.

In lieu of the specific propane precipitated resins mentioned above other resinous materials of equivalent viscosity and adhesive properties may be substituted in some cases. Thus, certain of the asphaltic resins, resins derived from rosin, copolymers of isobutylene and styrene sold under the trade name "S-Polymer," and polybutene, may be used to form the coating residue. They must, of course, be soluble in the solvent. These also may be mixed with the propane precipitated resins described above, with useful results.

Additional ingredients may also be incorporated as will be evident to those skilled in the art. Thus, oil soluble sulfonates may be added as in Patent No. 2,182,992, as well as metal deactivators and other known corrosion inhibitors such as sodium phosphite, sodium nitrite, sodium benzoate, and the like. Of the sulfonates, the oil soluble sodium sulfonate derived from petroleum sulfonic acids appears to be the most satisfactory in combination with the known partial esters of polyhydric alcohols such as sorbitan monooleate or monostearate, the corresponding ethylene oxide derivatives marketed by Atlas Powder Company as "Tweens," glycerol and pentaerythritol partial esters such as pentaerythritol monooleate, lecithin and the like. Sodium sulfonates are commonly synergistic with these materials as rust preventives.

Where a solvent type rust preventive must be used, the presence of the petroleum resin, especially a propane precipitated type resin, is particularly desirable. It serves to provide an adherent film after the solvent has evaporated, and it is peculiarly compatible with the rust inhibitors mentioned above.

It will be obvious that various other and conventional materials may be added to the composition of the invention without departing from the spirit thereof. In general, however, the ingredients named above are those which are preferred.

What is claimed is:

1. A rust preventive composition comprising about 75 to 98% by weight of volatile hydrocarbon solvent having a boiling point below about 500° F., about 1 to 15% by weight of a viscous propane precipitated resin from Pennsylvania oil residuum, and about 1 to 10% by weight of a mono-oleate ester of a polyhydric alcohol.

2. A rust inhibiting composition comprising about 85 to 93% by weight of volatile petroleum solvent having a boiling point below about 500° F., about 5 to 10% by weight of a viscous propane precipitated resin from Pennsylvania oil residuum, and about 2 to 5% by weight of a mono-oleate ester of a polyhydric alcohol.

3. Composition according to claim 1 wherein the polyhydric alcohol is sorbitan.

4. Composition according to claim 1 wherein the polyhydric alcohol is pentaerythritol.

5. Composition according to claim 1 wherein the polyhydric alcohol is glycerol.

References Cited in the file of this patent

UNITED STATES PATENTS

| | | |
|---|---|---|
| 2,250,185 | Mohler | July 22, 1941 |
| 2,337,336 | McCluer et al. | Dec. 21, 1943 |
| 2,392,497 | O'Neill | Jan. 8, 1946 |
| 2,481,372 | Fuchs et al. | Sept. 6, 1949 |